Dec. 8, 1936.
LOUIS-EUGÈNE-WIDOLT MONTROSE-OSTER
2,063,395
SAND DISCHARGING APPARATUS FOR VEHICLES
Original Filed Dec. 15, 1930
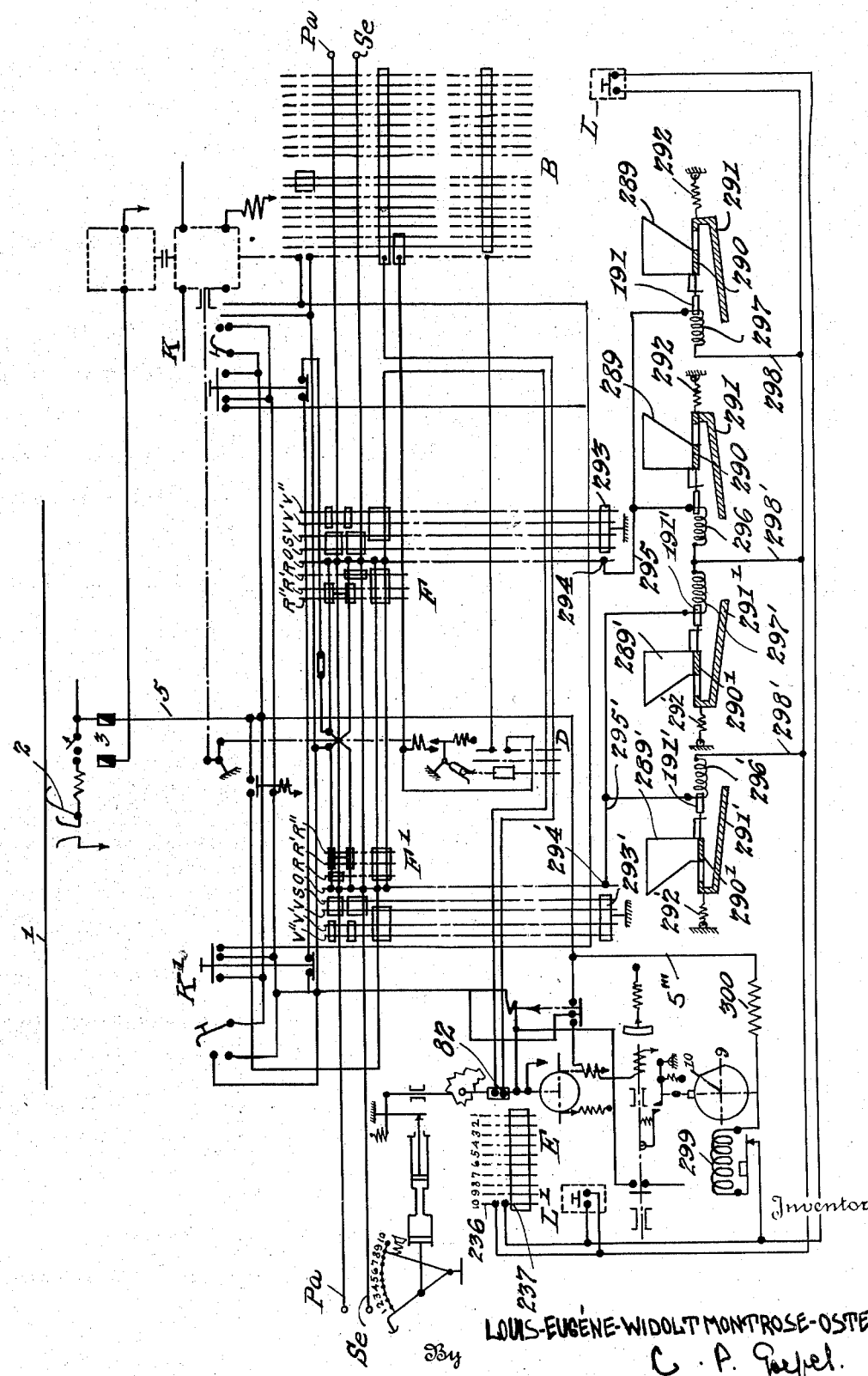

Patented Dec. 8, 1936

2,063,395

UNITED STATES PATENT OFFICE 2,063,395

SAND DISCHARGING APPARATUS FOR VEHICLES

Louis-Eugène-Widolt Montrose-Oster, Karlsbad, Czechoslovakia

Original application December 15, 1930, Serial No. 502,535. Divided and this application March 16, 1934, Serial No. 715,893. In Germany December 16, 1929

2 Claims. (Cl. 291—15)

This invention relates to sand discharging apparatus for vehicles, and constitutes a division of the subject matter disclosed in my copending application for patent on Multiple unit control system, Serial No. 502,535, filed December 15, 1930.

It is the primary object and purpose of the present invention to provide simple and positively operating means which may be automatically actuated in the application of the vehicle wheel brakes, or independently thereof, for the purpose of intermittently discharging sand in front of the forward truck wheels of the vehicle in order to obtain better traction or to quickly bring the vehicle to a stop.

More particularly, the present invention has for its object to provide in combination with a vehicle equipped with brake control means, electrically actuated sand discharging devices mounted adjacent to the truck wheels and means rendered effective in a certain definite position of a part of the brake controlling means for closing an electrical energizing circuit for the actuating means for certain of said sand discharging devices in accordance with the direction of travel of the vehicle.

It is a further general object of the invention to provide apparatus as above characterized, which consists of relatively few parts of simple construction, and which is particularly designed for application to motor driven vehicles at comparatively small cost, to function in a positive and reliable manner.

With the above and other objects in view, the invention consists in the improved sand discharging apparatus for vehicles, and in the form, construction and relative arrangement of the several parts thereof as will be hereinafter more fully described, illustrated in the accompanying drawing, and subsequently incorporated in the subjoined claims.

In the drawing, which illustrates one simple and practical embodiment of the invention, the figure diagrammatically illustrates the arrangement of the sand discharging devices relative to the truck wheels of the vehicle, together with the essential circuit connections between the actuating means therefor, the circuit controlling switches and the source of current.

In the multiple unit control system for motor vehicles disclosed in my pending application above referred to, there is provided on each motor vehicle a main controller for supplying current from an overhead feed line to the motors, an operating unit therefor and a starting switch which controls the supply of energy by said unit for the operation of said controller. However, these several units have no essential relation to the subject matter of the invention herein claimed, and are not therefore illustrated or described. In conjunction with said units, there are also employed reversing switches indicated at F and F' arranged at opposite ends of the vehicle together with the operator's switch levers K and K'. These reversing switches, in certain positions thereof, control the transmission of current over the transmission lines Pa and Se between the several motor vehicles to govern the operation of the main controllers. Since this, however, constitutes the subject matter of another copending application for patent, it will not be further referred to herein.

The levers K or K', when moved to certain selected positions, effect the operation of relays for initiating operation of the main controllers. These switch levers when moved to other selected positions also, through the medium of hydraulically actuated mechanism, such as shown in the application above identified, or other suitable means, govern the operation of the brake control drum E.

In so far as my present invention is concerned, the brake controlling means might be of various kinds, and means either common with the operator's control means for the current supply controller of the vehicle motors or independent thereof, might be provided for governing the operation of the brake control means. It is therefore to be understood that no claim is herein made to the particular features above referred to.

In the diagram, the vehicle drive motors (not shown) are arranged in pairs or groups with the usual armature and field connections between said motors and the interconnecting current conductors between the contacts of the reversing switches F and F'. Adjacent to each truck wheel driven by these motors, the sand reversing hoppers indicated at 289, 289' respectively are suitably mounted, each of said hoppers at its lower end being provided with a reciprocal discharge control valve 290, 290' respectively, having a part 291, 291' downwardly inclined towards the vehicle wheel for spraying the discharged sand in front thereof. To one end of each discharge valve, the movable core 191, 191' respectively of an electro-magnet is connected so that when the surrounding magnet coils 296, 296', 297, 297' are energized, the respective control valves are moved in one direction to discharge sand from the sand containing hoppers.

When the magnet coils are deenergized, said valves are returned to their normal closed positions by the springs 292, 292' respectively. The magnet coils 296, 297, for one pair of sand discharging devices, are connected by wires 298, 298' with the coils of the other pair of said devices, while wires 295, 295' connect the respective pairs of magnet coils with contacts 294, 294' of the reversing switches F and F' respectively, said contacts being engaged by the circuit closing segments 293, 293' respectively of the said switches.

The control drum E for the brake mechanism carries a circuit closing segment 82 which, in one position of the control drum, bridges the contacts 236 and 237 and thereby closes the circuit from the trolley line 1 through pole 2, connections 3, 5''' and a series resistance 300 to the intermittent relay or interrupter 299, and thence through connections 298 and 298' to the magnet coils of the several sand discharging devices. Thus, these coils are energized through the connections with the switch F or F' above described and moved to open positions. The deenergization of said coils by the intermittent relay or interrupter 299 results in a constant reciprocating motion of the valves 290, 290', said valves being returned to normal closed position by the springs 292, 292' each time the circuit is broken. Thus there is an intermittent discharge of the sand from the several hoppers which is sprayed in advance of the front truck wheels of the vehicle. Since, as explained in my copending application for patent, through the medium of my novel multiple unit control system, when the operator's lever K, K' in one vehicle is actuated to so move the brake control drum E to the position closing the circuit through contacts 236, 237, the brake control drum on every other vehicle in the train will be correspondingly operated to the same position, so that without the actuation of separate manually controlled means on each vehicle, sand will be properly discharged in front of the truck wheels of all vehicles in the train. Of course, it is understood that for travel in each direction, only one of the reversing switches is in position closing the circuit with the contact 294, 294' thereof respectively, so that the discharge of sand takes place only from two of the sand hoppers 289, 289' mounted in advance of the forward truck wheels.

In some instances during travel of the train, it may be necessary to discharge the sand in order to secure better traction without desiring to apply the brakes, and therefore, I provide the manually operable switches L, L' arranged at opposite ends of the vehicle which may be either foot or hand operated to close the control circuit for the sand discharging valve actuating devices independently of the brake control drum E.

From the foregoing description considered in connection with the accompanying drawing, the construction, manner of operation and several advantages of the present invention will be clearly understood. It will be seen that I have devised very simple means which is positive and reliable in its operation for effecting the economical discharge of the sand before the front truck wheels of the vehicle, so as to either aid in bringing the vehicle to a quick stop or for the purpose of obtaining better traction. It will be evident that in view of the simplicity of the device, it may be manufactured and applied to motor driven vehicles now in general use at comparatively small cost. I have herein disclosed what I believe to be a very practical embodiment of my present improvements. Nevertheless, it is to be understood that the same may be susceptible of various modifications in the form, proportion and relative arrangements of its several parts, and I accordingly reserve the privilege of resorting to all such legitimate changes therein as may be fairly embodied within the spirit and scope of the invention as claimed.

I claim:

1. In combination with a vehicle having front and rear wheel trucks, a movable brake controlling member, vehicle direction control instrumentalities, normally closed sand discharge devices associated with the front wheels of the vehicle in both directions of travel, electromechanical means for actuating said devices to open position, control circuits therefor, said vehicle direction control instrumentalities including separate pairs of contacts in each said control circuit operable respectively to circuit closing position in response to operation of the respective direction controlling instrumentalities for completing the control circuit to said electromechanical means associated with the front wheel of the respective trucks in accordance with the direction of travel of the vehicle, and means rendered effective in a definite predetermined position of said movable brake controlling member for closing that control circuit in which the contacts of a vehicle direction control instrumentality have been closed whereby to effect discharge of sand in accordance with existing direction of travel.

2. In combination with a vehicle having front and rear wheel trucks, a movable brake controlling member, vehicle direction control instrumentalities, normally closed sand discharge devices associated with the front wheels of the vehicle in both directions of travel, electromechanical means for actuating said devices to open position, control circuits therefor, said vehicle direction control instrumentalities including separate pairs of contacts in each said control circuit operable respectively to circuit closing position in response to operation of the respective direction controlling instrumentalities for completing the control circuit to said electromechanical means associated with the front wheel of the respective trucks in accordance with the direction of travel of the vehicle, switch means rendered effective in a definite predetermined position of said movable brake controlling member for closing that control circuit in which the contacts of a vehicle direction control instrumentality have been closed whereby to effect discharge of sand in accordance with existing direction of travel, and manually controlled switches connected to the respective control circuits in parallel with the last-mentioned switch means, said manually controlled switches being located one at each end of the vehicle and operable to cause actuation of the respective electromechanical means independently of the operation of said movable brake controlling member.

LOUIS-EUGÈNE-WIDOLT
MONTROSE-OSTER.